US007450944B2

(12) United States Patent
Leelahakriengkrai et al.

(10) Patent No.: US 7,450,944 B2
(45) Date of Patent: Nov. 11, 2008

(54) METHOD AND APPARATUS FOR BASE STATION SYNCHRONIZATION

(75) Inventors: Rangsan Leelahakriengkrai, Streamwood, IL (US); John M. Harris, Chicago, IL (US); Ivan N. Vukovic, Arlington Heights, IL (US); Fan Wang, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 600 days.

(21) Appl. No.: 11/266,469

(22) Filed: Nov. 3, 2005

(65) Prior Publication Data

US 2007/0099616 A1    May 3, 2007

(51) Int. Cl.
    *H04B 7/00*    (2006.01)
(52) U.S. Cl. .................. 455/436; 455/450; 455/453; 455/502; 370/331; 370/335; 370/336; 370/349; 370/350; 375/150; 375/326; 340/825
(58) Field of Classification Search .................. 455/436
    See application file for complete search history.

(56) References Cited

U.S. PATENT DOCUMENTS

| 3,787,665 | A | * | 1/1974 | Watson et al. ............... 370/507 |
| 4,029,900 | A | * | 6/1977 | Addeo .......................... 375/365 |
| 4,041,391 | A | * | 8/1977 | Deerkoski ..................... 375/281 |
| 4,516,269 | A | * | 5/1985 | Krinock ........................ 455/503 |
| 4,597,077 | A | * | 6/1986 | Nelson et al. ................. 370/352 |
| 4,679,191 | A | * | 7/1987 | Nelson et al. ................. 370/355 |
| 5,296,849 | A | * | 3/1994 | Ide ............................. 340/7.43 |
| 5,301,187 | A | * | 4/1994 | Reum .......................... 370/276 |
| 5,317,602 | A | * | 5/1994 | Onoda et al. ................. 375/371 |
| 5,774,829 | A | * | 6/1998 | Cisneros et al. .............. 701/213 |
| 5,793,416 | A | * | 8/1998 | Rostoker et al. .......... 348/14.13 |
| 5,805,581 | A | * | 9/1998 | Uchida et al. ................ 370/335 |
| 5,835,508 | A | * | 11/1998 | Kushita ....................... 714/748 |
| 6,031,828 | A | * | 2/2000 | Koro et al. ................... 370/336 |
| 6,091,786 | A | * | 7/2000 | Chen et al. ................... 375/326 |
| 6,112,100 | A |  | 8/2000 | Ossoinig et al. |
| 6,163,563 | A | * | 12/2000 | Baker et al. .................. 375/130 |
| 6,351,463 | B1 | * | 2/2002 | DeSantis et al. ............. 370/350 |
| 7,103,027 | B2 | * | 9/2006 | Dick et al. ................... 370/335 |
| 7,403,555 | B2 | * | 7/2008 | Demir et al. ................. 375/145 |
| 2001/0021179 | A1 | * | 9/2001 | Tiedemann et al. .......... 370/333 |
| 2001/0034233 | A1 | * | 10/2001 | Tiedemann et al. .......... 455/436 |

(Continued)

FOREIGN PATENT DOCUMENTS

EP    1 303 157 A1    4/2002

(Continued)

*Primary Examiner*—Matthew D. Anderson
*Assistant Examiner*—Hai V Nguyen

(57) ABSTRACT

An apparatus and method for monitoring (310) at least one factor relating to a wireless communication system (100) is provided such that a synchronization signal is sent (320) to at least one base transceiver station (130) neighboring a primary base transceiver station (120) at least in part according to a predetermined function of the monitored factor(s). The monitored factor may be any of several factors that weigh on the operation of the wireless communication system. The synchronization signal itself may vary in how it signals to the neighboring base transceiver station(s) (130) to synchronize with the data to be sent to a given mobile station (110) from its primary base transceiver station (120), and the number of synchronization signals sent over a given time may vary according to the predetermined function of the monitored factor(s).

20 Claims, 3 Drawing Sheets

U.S. PATENT DOCUMENTS

| | | |
|---|---|---|
| 2001/0036820 A1 | 11/2001 | Fong et al. |
| 2002/0064072 A1* | 5/2002 | Ooishi et al. ............ 365/189.05 |
| 2002/0072381 A1 | 6/2002 | Becker et al. |
| 2002/0122396 A1* | 9/2002 | Terasawa .................... 370/331 |
| 2002/0177460 A1 | 11/2002 | Beasley et al. |
| 2003/0057003 A1* | 3/2003 | Kawada et al. ............. 180/65.1 |
| 2003/0067896 A1 | 4/2003 | Chuah et al. |
| 2003/0103407 A1* | 6/2003 | Ooishi et al. ................ 365/233 |
| 2003/0162539 A1* | 8/2003 | Fiut et al. ................... 455/424 |
| 2003/0174666 A1* | 9/2003 | Wallace et al. .............. 370/324 |
| 2004/0082349 A1 | 4/2004 | Pinault |
| 2004/0180661 A1* | 9/2004 | Chen et al. .................. 455/436 |
| 2004/0202262 A1* | 10/2004 | Demir et al. ................. 375/354 |
| 2004/0203734 A1* | 10/2004 | Ishii ........................ 455/426.1 |
| 2004/0203782 A1* | 10/2004 | Peng et al. .................. 455/436 |
| 2004/0240592 A1* | 12/2004 | Meyer et al. ................. 375/343 |
| 2004/0248602 A1* | 12/2004 | Demir et al. ................. 455/502 |
| 2005/0014533 A1* | 1/2005 | Cave et al. ............... 455/562.1 |
| 2005/0018795 A1* | 1/2005 | Studenny et al. ............ 375/343 |
| 2005/0048975 A1* | 3/2005 | Ranta-Aho et al. .......... 455/438 |
| 2005/0068424 A1* | 3/2005 | Kaneko et al. ........... 348/222.1 |
| 2005/0120282 A1* | 6/2005 | Kim ............................ 714/707 |
| 2005/0147191 A1* | 7/2005 | Geier et al. .................. 375/344 |
| 2005/0272436 A1* | 12/2005 | Trott et al. ................... 455/450 |
| 2006/0126573 A1* | 6/2006 | Dick et al. ................... 370/335 |
| 2006/0133464 A1* | 6/2006 | Demir et al. ................. 375/150 |
| 2006/0140152 A1* | 6/2006 | Wang et al. .................. 370/331 |
| 2006/0193295 A1* | 8/2006 | White et al. ................. 370/336 |
| 2006/0223520 A1* | 10/2006 | Laroia et al. .............. 455/422.1 |
| 2006/0233137 A1* | 10/2006 | Dantu et al. ................. 370/331 |
| 2007/0010210 A1* | 1/2007 | Singh et al. .................... 455/73 |
| 2007/0021126 A1* | 1/2007 | Nanda et al. .............. 455/456.1 |
| 2007/0066329 A1* | 3/2007 | Laroia et al. ................. 455/502 |
| 2007/0076680 A1* | 4/2007 | Amram et al. .............. 370/349 |
| 2007/0077938 A1* | 4/2007 | Bi et al. ....................... 455/453 |
| 2007/0116094 A1* | 5/2007 | Parts et al. ................... 375/130 |
| 2007/0173256 A1* | 7/2007 | Laroia et al. ................. 455/436 |
| 2007/0182812 A1* | 8/2007 | Ritchey ........................ 348/36 |
| 2007/0253389 A1* | 11/2007 | Lucidarme et al. .......... 370/338 |

FOREIGN PATENT DOCUMENTS

WO      WO 02/101966 A2      12/2002

* cited by examiner

METHOD AND APPARATUS FOR BASE STATION SYNCHRONIZATION

TECHNICAL FIELD

This invention relates generally to wireless communication systems and more particularly to wireless communication systems that synchronize the data sent from base stations to facilitate mobile station transfers between base stations.

BACKGROUND

Many wireless communication systems are known in the art. In such systems, a mobile station, such as a phone, wirelessly networked computer, or other wireless communication device transmits data to and from a stationary transceiver. The stationary transceiver, commonly known as a base transceiver station, is connected to a network such that information may be shared with other systems. Because the mobile stations move relative to the base transceiver stations, eventually the wireless signal will weaken to the point that the mobile station will need to switch its wireless communication to another base transceiver station.

Wireless communication systems employ various known techniques to facilitate the transfer of a mobile station from one base transceiver station to another. Certain wireless communication systems will wait until the system determines that the mobile station needs to transfer base transceiver stations to begin a transfer of data. In such a system, the transfer cannot occur until the mobile station signals to the system that a transfer should occur. In a typical system, at that time, a controller will then forward the data to be sent to the mobile station to the target base station transceiver instead of the primary base station transceiver. Waiting for this data transfer results in a delay in the operation of the system for the mobile station user.

In certain high speed networks, a central server will forward the data to be sent to a mobile station to every base transceiver station in the active area of the mobile station at a given frequency or at certain times or intervals to reduce the delay experienced during a handoff. In other words, the system will send the data to not only the base transceiver station with which the mobile station is communicating, the primary base transceiver station, but also to every base transceiver station to which the mobile station may switch its communication surrounding that primary base transceiver station. This flooding technique results in larger data traffic volumes within the network as data is needlessly sent to multiple base transceiver stations. The larger data volumes, in turn, can overly tax the system's resources.

Further, when a mobile station experiences a handoff in such a high speed system, the target base transceiver station will send all the data previously received by the target base transceiver station for that mobile station. Often, the mobile station had previously received much of this data from the primary base transceiver station prior to the handoff. Sending synchronization signals to the base transceiver stations neighboring the primary base transceiver station to synchronize the data at the neighboring base transceiver stations with the data at the primary base transceiver station can reduce the redundancy in resending data to the mobile station during handoffs. Sending too many synchronization signals or not tailoring the synchronization signals to the system, however, can introduce further inefficiencies and burdens on the system.

BRIEF DESCRIPTION OF THE DRAWINGS

The above needs are at least partially met through provision of the method and apparatus for base station synchronization described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the arts will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, an apparatus and method for monitoring at least one factor relating to a wireless communication system is provided such that a synchronization signal is sent to at least one base transceiver station neighboring a primary base transceiver station at least in part according to a predetermined function of the monitored factor(s). The monitored factor may be any of several factors that weigh on the operation of the wireless communication system. Similarly, the synchronization signal may vary depending on the system. For example, the number of synchronization signals sent over a given time may vary. Further, the type and amount of data sent as part of the synchronization signal may also vary depending on the system.

Advantageously, this method and apparatus for synchronizing base stations allows for adaptation of the synchronization signals to the condition of the wireless communication system to optimize performance. For example, the delay experienced when performing a handoff may be reduced by efficiently synchronizing data between a target base transceiver station and the primary base station transceiver. Additionally, fewer system resources need be used by tailoring the number of base transceiver stations which receive synchronization data to the needs of the mobile station. Further efficiencies may be gained by adjusting the number of synchronization signals sent to the conditions of the system.

Figure 1:
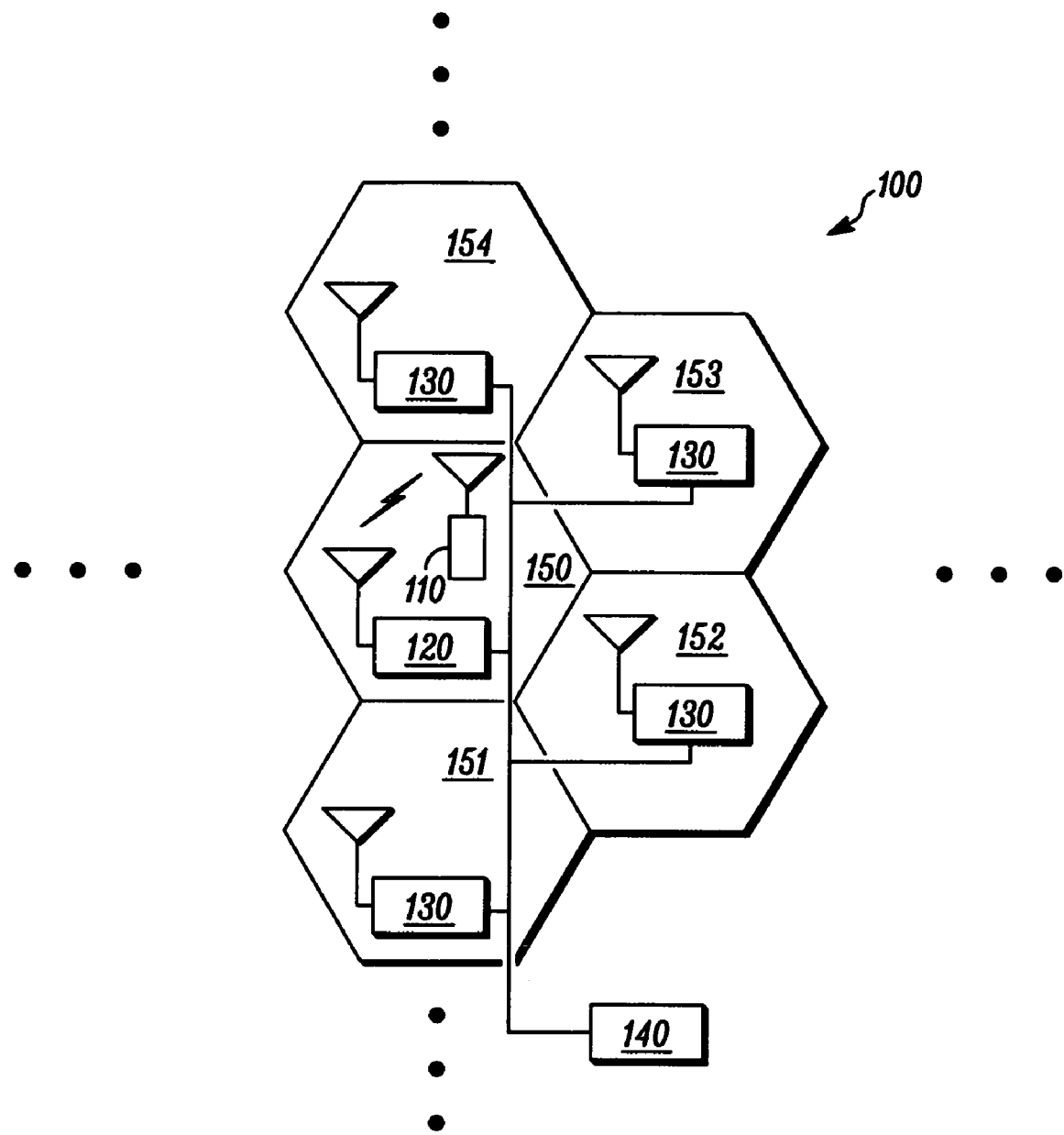
FIG. 1 is a block diagram of a wireless communication system as configured in accordance with various embodiments of the invention.

Referring now to the drawings, and in particular to FIG. 1, a wireless communication system 100 is provided including a mobile station 110 in wireless communication with a primary base transceiver station 120. The primary base transceiver station 120 is identical to or similar to the neighboring base transceiver stations 130 elsewhere in the wireless communication system 100. The base transceiver stations are networked or otherwise in communication with a base station controller 140. A wireless communication zone 150 is defined around the primary base transceiver station 120. Similarly, wireless communication zones 151, 152, 153, and 154 are defined around each base transceiver station 130. A mobile station in a zone will likely have as its primary base transceiver station the base transceiver station for that zone, and the mobile station will likely transfer its communications via a known handoff procedure to a new base transceiver station when the mobile station moves to a new zone within the wireless communication system 100.

Figure 2:
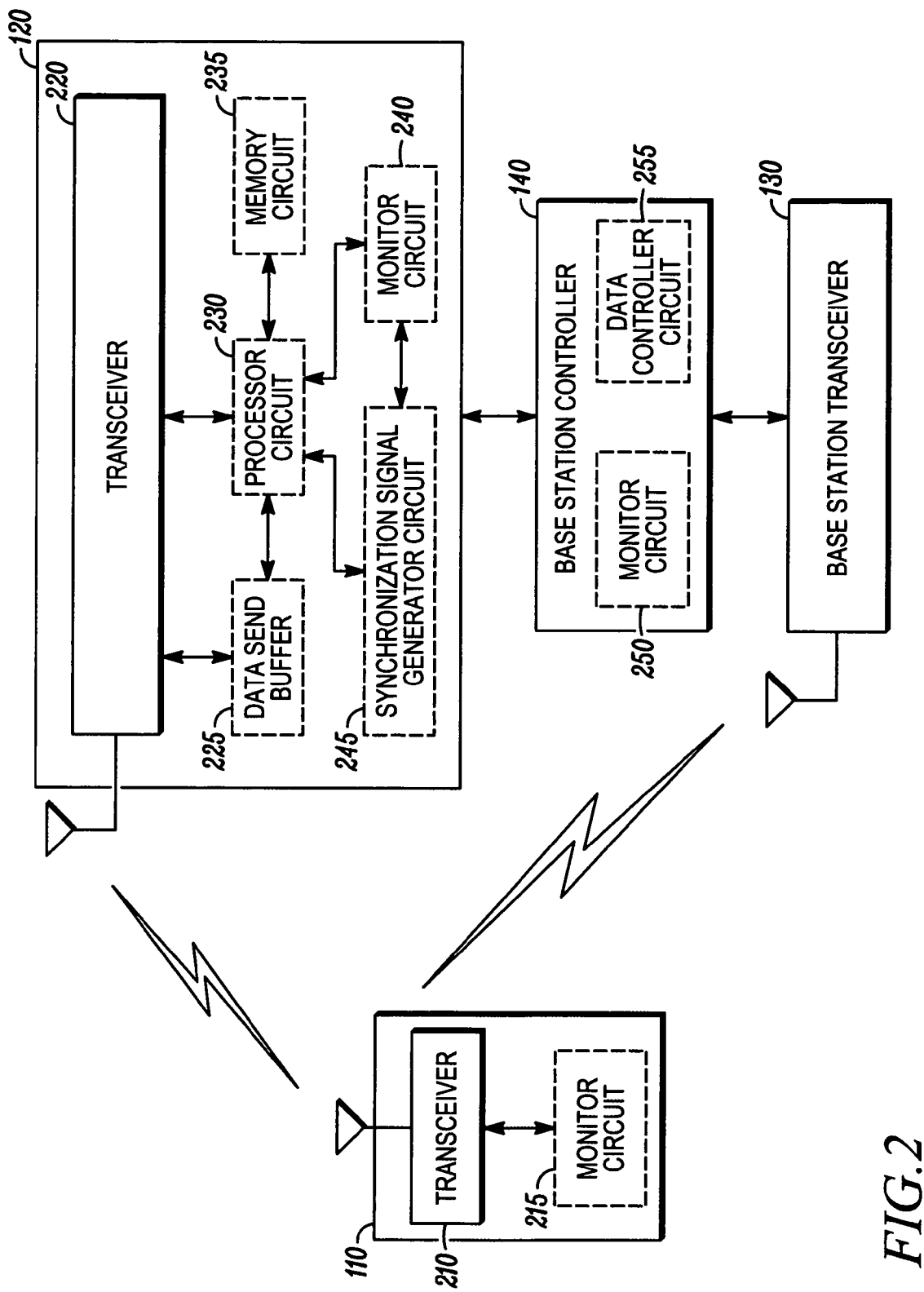
FIG. 2 is a block diagram of a portion of the wireless communication system of FIG. 1 as configured in accordance with various embodiments of the invention.

A typical embodiment of the invention will be described with reference to FIG. 2. The mobile station 110 is in wireless communication with the primary base transceiver station 120. The mobile station 110 includes a transceiver 210 and a monitor circuit 215. The monitor circuit 215 typically includes one or more of the following: a peak hour time monitor, a quality of channel factor monitor, a quality of service factor monitor, a mobility factor monitor, a transmission rate monitor, and/or other appropriate monitor.

The primary base transceiver station 120 may include several components such as a transceiver 220 that is responsive at least in part to a data send buffer 225 and a processor circuit 230. The data send buffer 225 is also responsive to the processor circuit 230, and the processor circuit 230 is responsive to a memory circuit 235 and a monitor circuit 240. The monitor circuit 240 is capable of monitoring one or more factors relative to the wireless communication system 100. The monitor circuit 240 may comprise one or more of the following: a peak hour time monitor, a primary base transceiver station quality of channel factor monitor, a neighboring base transceiver station quality of channel factor monitor, a quality of service factor monitor, a sent data monitor, a buffer monitor, a transmission rate monitor, and/or other appropriate factor monitor. A synchronization signal generator circuit 245 is responsive to the processor circuit 230 and the monitor circuit 240.

A base station controller 140 is in communication with a plurality of base transceiver stations 120 and 130. Typically, the base station controller 140 is in communication with each base transceiver station 130 that neighbors the primary base transceiver station 120. The base station controller 140 also may include a monitor circuit 250 and a data controller circuit 255. The monitor circuit 250 may comprise one or more of the following: a peak hour time monitor, a traffic load for a sector monitor, a quality of channel factor monitor, a quality of service factor monitor, a mobility factor monitor, a sent data monitor, a transmission rate monitor, and/or other appropriate factor monitor. The synchronization signal generator circuit 245 may be responsive to the monitor circuit 250.

One skilled in the art will recognize that the various individual circuits, monitors, and elements described herein, even when combined as described to form an embodiment of the invention, are readily designed by one skilled in the art and may operate in conjunction with various software elements to perform according to this description. For example, the various monitors are typically processor circuits operating in conjunction with certain software elements. Other enabling structure can be applied by those skilled in the art as desired as well.

It will be further understood that the various monitor circuits 215, 240, and/or 250 will output a signal corresponding to the factor being monitored. This signal will be communicated to the synchronization signal generator circuit 245, typically through the processor circuit 230, such that the synchronization signal generator circuit 245 may send synchronization signals in part in response to a function of the factors monitored by the monitor circuits 215, 240, and/or 250. For example, for a factor monitored by a first monitor circuit 215, a signal from this monitor circuit 215 will be sent wirelessly during the normal operation of the mobile station 110 to the primary base transceiver station 120 whereupon it will be received by the processor circuit 230. Similarly, for a factor monitored by a second monitor circuit 250, a signal from this second monitor circuit 250 will be transmitted during the normal operation of the base station controller 140 to the primary base transceiver station 120 whereupon it will be received by the processor circuit 230. The processor circuit 230 in coordination with the synchronization signal generator circuit 245 will then apply the predetermined function to the factor based on the received signal, and the synchronization signal generator circuit 245 will generate synchronization signals according to the function. One skilled in the art will recognize that the processor circuit 230 and the synchronization signal generator circuit 245 may be separate structures or contained within the same circuitry or structure.

Figure 3:
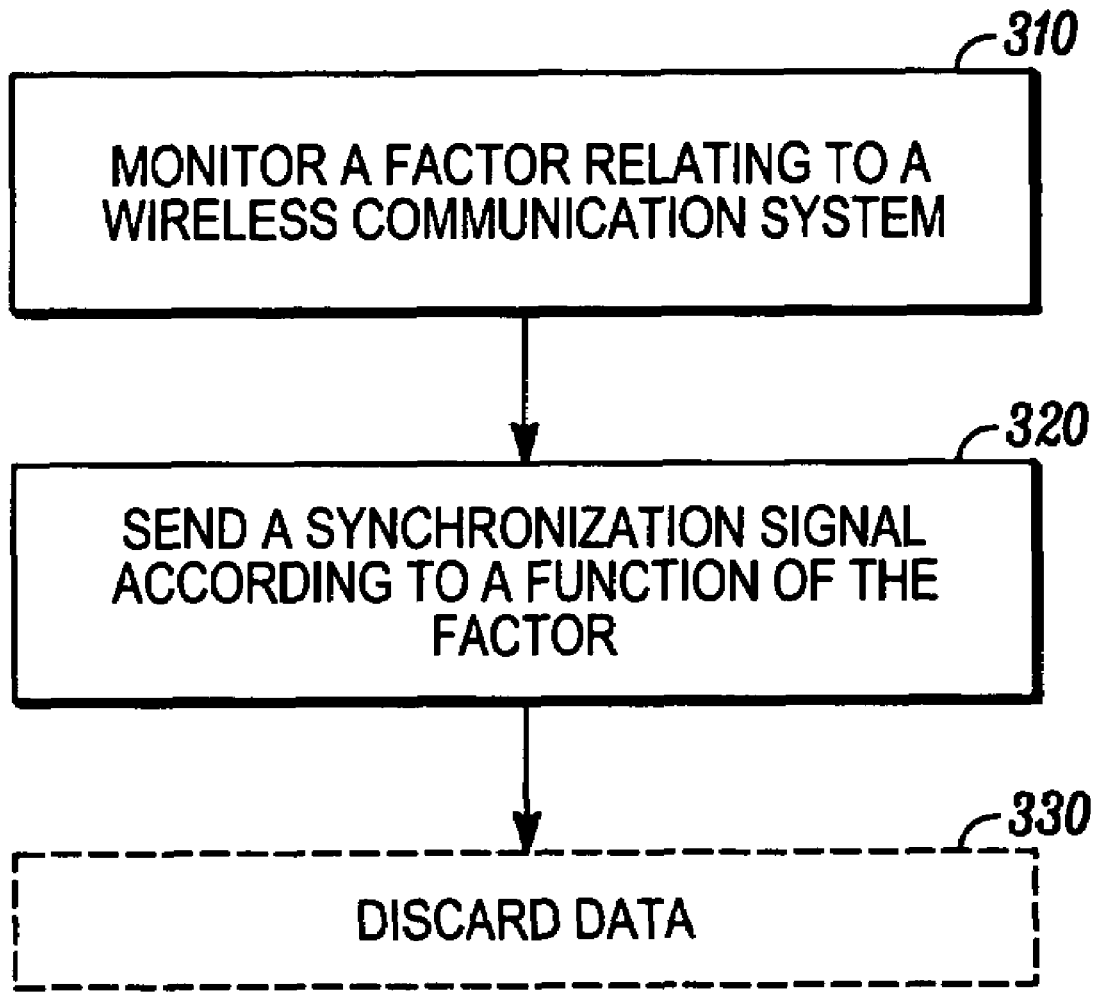
FIG. 3 is a flow diagram depicting a method as configured in accordance with various embodiments of the invention.

The operation of a typical embodiment of this invention will be further described with reference to FIG. 3. The monitor circuit 215, 240, and/or 250 monitors 310 at least one factor relating to a wireless communication system 100. The synchronization signal generator circuit 245 sends 320 a synchronization signal to at least one base transceiver station 130 neighboring a primary base transceiver station 120 at least in part according to a predetermined function of the at least one factor. The synchronization signal may be any signal to the neighboring base transceiver stations 130 that facilitates synchronization with the primary base transceiver station 120 such that redundancy in data transmission is lessened during a handoff of a mobile station 110 from the primary base transceiver station 120 to a neighboring base transceiver station 130.

For example, the step of sending 320 the synchronization signal may include sending a signal corresponding to an indication of data at a front end of the data send buffer circuit 225 corresponding to the primary base transceiver station 120. In such an embodiment, the neighboring base transceiver stations 130 receive data to send to the mobile station 110 in case the mobile station 110 transitions to one of the neighboring base transceiver stations 130. The processor circuit 230 reads the data send buffer circuit 225 to determine the data portions at the front end of the buffer that are then most likely to be sent. The synchronization signal generator circuit 245 in conjunction with the processor circuit 230 generates the synchronization signal which is sent to and notifies the neighboring base transceiver stations 130 as to which data portion is close to being sent by the primary base transceiver station 120. In this manner, the neighboring base transceiver stations 130 may arrange the data stored at the neighboring base transceiver stations 130 to place the indicated data at the front end of the buffer.

In an alternative embodiment, the step of sending 320 the synchronization signal may include sending a signal corresponding to a mapping of data stored in a data send buffer circuit 225 corresponding to the primary base transceiver station 120. In this embodiment, the processor circuit 230 reads the data send buffer circuit 225 to map the data in the buffer. The synchronization signal generator circuit 245 in conjunction with the processor circuit 230 generates the synchronization signal which provides a data map of the data in the data send buffer circuit 225 such that the neighboring base transceiver stations 130 may arrange their data to be identical or substantially the same as the data in the primary base transceiver station 120.

In another embodiment, the step of sending 320 the synchronization signal may include the processor circuit's 230 determining at the primary base transceiver station 120 a transmission rate history for a mobile station 110, the processor circuit's 230 predicting in accordance with the transmission rate history a data set that will be at a front end of a data send buffer circuit 225 corresponding to the primary base transceiver station 120 when a neighboring base transceiver station 130 receives the synchronization signal, and the synchronization signal generator circuit's 245 sending a signal corresponding to the data set. In this embodiment, the processor circuit 230, in conjunction with a memory circuit 235, tracks the transmission history for data sent to the mobile station 110. By analyzing that transmission history stored in the memory circuit 235 using known algorithms, the processor circuit 230 can predict what data in the data send buffer circuit 225 will most likely be next to send to the mobile station 110 when a synchronization signal reaches a neighboring base transceiver station 130. Therefore, the synchronization signal generator circuit 245 in conjunction with the processor circuit 230 will send a signal to one or more neighboring base transceiver stations 130 that indicates to the stations what data is most likely to be sent next to the mobile station 110.

In yet another embodiment, the step of sending 320 the synchronization signal may include the processor circuit's 230 determining at the primary base transceiver station 120 a transmission rate history for a mobile station 110, the processor circuit's 230 predicting in accordance with the transmission rate history a certain data set that will be at a front end of a data send buffer circuit 225 corresponding to the primary base transceiver station 120 when a neighboring base transceiver station 130 receives the synchronization signal, and the synchronization signal generator circuit's 245 sending a signal corresponding to the certain data set. Similar to the other embodiments, the neighboring base transceiver stations 130 receive data to send data to the mobile station 110 in case the mobile station 110 transitions to one of the neighboring base transceiver stations 130. Then, in this embodiment, the processor circuit 230, in conjunction with a memory circuit 235, tracks the transmission history and/or call type for data sent to the mobile station 110. By analyzing that call type (e.g. a streaming service) or transmission history stored in the memory circuit 235 using known algorithms, the processor circuit 230 can predict the certain data set in the data send buffer circuit 225 that will be next sent to the mobile station 110 when a synchronization signal reaches a neighboring base transceiver station 130 or force that certain data set to be the next to be sent to the mobile station 110. Therefore, the synchronization signal generator circuit 245 in conjunction with the processor circuit 230 will send a signal to one or more neighboring base transceiver stations 130 that indicates to the stations the certain data set to be sent next to the mobile station 110 upon receipt of the synchronization signal or over the next time interval.

This embodiment can be applied to streaming services, for example, where the synchronization signal indicates to the neighboring base transceiver stations 130 that exactly one additional packet will be sent by the end of each 200 millisecond interval, starting at a given time. Additionally, the synchronization signal can indicate that each of those packets will not be sent earlier than 200 milliseconds before the time by which they are guaranteed to be delivered. In other words, in this example, the packet is guaranteed to be delivered sometime during a specific 200 millisecond interval. Thus, in this case, if a reselection or handoff occurs on one of these 200 millisecond boundaries, then the target base transceiver station can know exactly which data has been transmitted from the previous primary base transceiver station.

In yet another alternative embodiment, the step of sending 320 the synchronization signal may include the processor circuit's 230 determining at the primary base transceiver station 120 a transmission rate history for a mobile station 110 and the synchronization signal generator circuit's 245 sending a signal corresponding to the transmission rate history. Similar to the other embodiments, the neighboring base transceiver stations 130 receive data to send to the mobile station 110 in case the mobile station 110 transitions to one of the neighboring base transceiver stations 130. Then, in this embodiment, the processor circuit 230, in conjunction with a memory circuit 235, tracks the transmission history for data sent to the mobile station 110. The synchronization signal generator circuit 245 in conjunction with the processor circuit 230 will send a signal to the one or more neighboring base transceiver stations 130 that corresponds to the transmission history. By analyzing that transmission history using known algorithms, a processor circuit in the neighboring base transceiver stations 130 can determine according to the transmission rate history discardable data that need not be sent to the mobile station 110 because such data will be redundant. The neighboring base transceiver stations 130 then may discard 330 the discardable data. In this way, the neighboring base transceiver stations 130 may determine and set the data that will be the next sent to the mobile station 110 at a given time.

Similarly, under any of the above embodiments, the neighboring base transceiver stations 130 may discard 330 data in response to receiving the synchronization signal. In this way, the neighboring base transceiver stations 130 may discard 330 whatever data will not need to be sent to the mobile station 110 should the mobile station 110 transition into active communication with the neighboring base transceiver station 130. Therefore, redundant data is eliminated, lessening the volume of data transmitted in the system.

In another alternative, the step of sending 330 the synchronization signal is performed in conjunction with sending data other than the synchronization signal to a base station controller 140 from the primary base transceiver station 120. One skilled in the art will recognize that to send a synchronization signal from the primary base transceiver station 120 to one or more neighboring base transceiver stations 130, the primary base transceiver station 120 will typically send the synchronization signal to the base station controller 140 that in turn will direct the synchronization signal to the appropriate neighboring base transceiver station(s) 130. By piggy-backing the synchronization signal along with other data sent to the base station controller 140 during the normal operation of the primary base transceiver station 120, this embodiment will conserve the resources involved in sending multiple messages to the base station controller 140 from the primary base transceiver station 120.

Also, under any of the above embodiments, the step of sending 320 the synchronization signal may be performed in conjunction with sending updated data to the one or more neighboring base transceiver stations 130. This alternative streamlines the process of sending the synchronization signals by associating such signals with the data sent to the neighboring base transceiver stations 130 for the purpose of speeding up the handoff procedure. In one such embodiment, the synchronization signal is sent to the base station controller 140 which stores the synchronization signal until the data controller circuit 255 determines that data should be sent to one or more neighboring base transceiver stations 130. Thus, the synchronization signal may be sent with such data.

The sending of the synchronization signal may be controlled by a predetermined function of one or more factors of the wireless communication system. As noted above, any number of monitors 215, 240, and/or 250 at the mobile station 110, a base transceiver station 120 and/or 130, and/or at a base station controller 140 may monitor 310 any number of the factors. Depending on the factors monitored, the predetermined function determines when or how often synchronization signals are sent to the one or more neighboring base transceiver stations 130 that receive the signals.

In one alternative, the peak hour time monitor monitors whether the wireless communication system 100 is operating at a peak hour time. The peak hour time is a time during which the system 100 typically experiences the highest call and/or data traffic volumes, and the peak hour time can be previously determined based on the system's history or can be determined by the base station controller 140 or other structure on a periodic basis. The peak hour time monitor can be located at the base station controller 140, the primary base transceiver station 120, the mobile station 110, or other appropriate location. In operation, the peak hour time monitor typically monitors the peak hour time and is in communication with the processor circuit 230 and/or the synchronization signal generator circuit 245 such that the synchronization signal generator circuit 245 sends synchronization signals at a predetermined rate when the peak hour time monitor detects that the wireless communication system 100 is operating at the peak hour time. The predetermined rate will be at a rate less than the rate at which synchronization signals are sent when the wireless communication system 100 operates at a time outside of the peak hour time so that the synchronization signals do place further strain on the system 100 when the system 100 experiences high traffic volumes.

In another embodiment, the traffic load monitor monitors the traffic load for at least a portion of the wireless communication system 100. The traffic load monitor can be located at the base station controller 140, the primary base transceiver station 120, or other appropriate location. In operation, the traffic load monitor, as typically located at the base station controller 140, monitors the traffic load for the group of base transceiver stations controlled by the base station controller 140. Alternatively, the traffic load monitor when located at the primary base transceiver station 120 monitors the traffic load for the primary base transceiver station 120. Based upon the monitored traffic load, the synchronization signal generator circuit 245 in communication with the traffic load monitor sends synchronization signals at a predetermined rate when detecting that the traffic load for a sector exceeds a predetermined level. The predetermined level is set according to the traffic capacity for the particular portion of the wireless communication system 100 monitored by the traffic load monitor. Therefore, the predetermined rate will be at a rate less than the rate at which synchronization signals are sent when the traffic load is below the predetermined level so that the synchronization signals do not further overburden the system 100 when experiencing high signal traffic volumes.

In yet another embodiment, a primary base transceiver station quality of channel factor monitor and a neighboring base transceiver station quality of channel factor monitor will monitor the signal strength or other appropriate factors relating to the quality of the communication channel between the primary base transceiver station 120 and the mobile station 110 and between a neighboring base transceiver station 130 and the mobile station 110. The primary base transceiver station quality of channel factor monitor is typically located at the primary base transceiver station 120, and the neighboring base transceiver station quality of channel factor monitor is typically located at a neighboring base transceiver station 130. Alternatively, the quality of channel factor monitor may be located at the mobile station 110 for monitoring each communication channel.

The quality of channel factor monitors typically detect the signal strength using any known circuitry and associated algorithms to detect the signal strength between a given mobile station 110 and a base transceiver station. The processor circuit 230 using known or readily developable algorithms monitors the relationship between the primary base transceiver station's 120 monitored quality of channel factor relative to the mobile station 110 and the neighboring base transceiver station's 130 monitored quality of channel factor relative to the mobile station 110. Based upon this relationship, the synchronization signal generator circuit 245 in communication with the processor circuit 230 sends synchronization signals at a predetermined rate when detecting that the quality of channel factor of the at least one base transceiver station 130 neighboring the primary base transceiver station 120 exceeds a predetermined level relative to the primary base transceiver station quality of channel factor. The predetermined level is typically based upon a signal strength ratio that indicates that the mobile station is likely to soon experience a handoff from the primary base transceiver station 120 to a neighboring base transceiver station 130. Therefore, the predetermined rate will be at an increased level when the neighboring base transceiver station signal strength exceeds a predetermined level relative to the primary base transceiver station signal strength to increase the efficiency of the handoff when the handoff to the neighboring base transceiver station 130 occurs. Alternatively, the synchronization signal generator circuit 245 in communication with the processor circuit 230 sends synchronization signals at a predetermined rate when detecting that the quality of channel factor of the primary base transceiver station 120 exceeds a predetermined level because at higher quality levels, the mobile station 110 is unlikely to experience a handoff.

In a similar embodiment, a quality of service factor monitor monitors a quality of service factor for the mobile station 110. Typically, the quality of service factor monitor detects one or more factors relative to the quality of service for the mobile station 110 relative to the primary base transceiver station 120 during data transmission such as bit error rate and so forth. Alternatively, the quality of service factor monitor may detect one or more quality of service factors for the mobile station 110 relative to one or more neighboring base transceiver stations 130. The quality of service factor monitor may be located in the mobile station 110 for any case, in the primary base transceiver station 120 to monitor the quality of service between the primary base transceiver station 120 and the mobile station 110, or in a neighboring base transceiver station 130 to monitor the quality of service between the neighboring base transceiver station 130 and the mobile station 110.

In communication with the quality of service factor monitor and/or the processor circuit 230, the synchronization signal generator circuit 245 sends synchronization signals at a predetermined rate when detecting that the quality of service factor exceeds a predetermined level. For example, the quality of service factor monitor measures the error rate between the mobile station 110 and the primary base transceiver station 120. When the error rate drops below a predetermined level indicating that the quality of service between the mobile station 110 and the primary base transceiver station 120 is better than the predetermined level, the synchronization signal generator circuit 245 will send synchronization signals at a lesser rate than when the error rate exceeds the predetermined level. In other words, the synchronization signals will be sent less often when the quality of service between the primary base transceiver station and the mobile station is high because it is unlikely that the mobile station will need a handoff when the quality of service is high. Such an embodiment is particularly useful when the mobile station 110 is receiving streaming data because the quality of service strongly affects the quality of the mobile station 110 user's experience.

In still another embodiment, a mobility factor monitor monitors a mobility factor for a given mobile station 110. Typically, the mobility factor monitor is located in a base station controller 140 or in the mobile station 110. The mobility factor monitor measures, for example, the rate at which the mobile station 110 is moving thereby necessitating handoffs between base transceiver stations. In communication with the mobility factor monitor and/or the processor circuit 230, the synchronization signal generator circuit 245 sends synchronization signals at a predetermined rate when detecting that the mobility factor exceeds a predetermined level. Typically, the predetermined rate is an increased rate when the mobility factor exceeds the predetermined level because a mobile station that has a high mobility will likely experience more handoffs. Therefore, sending more synchronization signals for that mobile station increases the efficiency when the handoffs do occur.

In another alternative embodiment, a sent data monitor monitors a data amount sent to a given mobile station 110 from the primary base transceiver station 120. The sent data monitor is typically located at the primary base transceiver station 120 but may also be located at the base station controller 140. In communication with the sent data monitor and/or the processor circuit 230, the synchronization signal generator circuit 245 sends synchronization signals at a predetermined rate when detecting that the data amount sent to the mobile station 110 from the primary base transceiver station 120 exceeds a predetermined level. In this way, synchronization signals typically are sent more often when the mobile station 110 receives higher volumes of data. This arrangement increases efficiencies by ensuring that a lesser volume of old data is sent to the mobile station 110 upon a handoff.

In another alternative, a buffer monitor monitors a buffer data size stored in a buffer corresponding to the primary base transceiver station 120. The buffer monitor is often at the primary base transceiver station 120 and in communication with a data send buffer 225. In communication with the buffer monitor and/or the processor circuit 230, the synchronization signal generator circuit 245 sends synchronization signals at a predetermined rate when detecting that the buffer data size stored in the data send buffer 225 exceeds a predetermined level. Typically then, synchronization signals are sent less often when the buffer data size exceeds certain levels because larger amounts of data are yet to be sent to the mobile station 110. Conversely, synchronization signals may be sent more often when the buffer data size decreases because less data will be sent. In this way, the synchronization signals are sent more often when there is less data to manage during a handoff of the mobile station 110 thereby increasing efficiency. In other words, the synchronization signals are sent more often when the rate of data being sent to the mobile station 110 is higher. This is advantageous because if data is sent to the mobile station 110 more rapidly, then a larger discrepancy can arise between the data sent from the primary base transceiver station 120 and the synchronization data at the neighboring base transceiver station(s) 130.

In still another alternative, a transmission rate monitor monitors a transmission rate from the primary base transceiver station 120 to the mobile station 110. The transmission rate monitor is typically at the primary base transceiver station 120 and in communication with a data send buffer 225. In communication with the transmission rate monitor and/or the processor circuit 230, the synchronization signal generator circuit 245 sends synchronization signals at a predetermined rate when detecting that the transmission rate exceeds a predetermined level. Typically then, synchronization signals are sent more often when the transmission rate exceeds certain levels because larger amounts of data are being sent to the mobile station 110. Conversely, synchronization signals may be sent less often when the transmission rate decreases because less data is being sent. In this way, the synchronization signals are sent more often when there is more data passing to the mobile station 110 thereby increasing efficiency or the accuracy of the synchronization signal. In other words, the synchronization signals are sent more often when the rate of data being sent to the mobile station 110 is higher. This is advantageous because if data are sent to the mobile station 110 more rapidly, then a larger discrepancy can arise between the data sent from the primary base transceiver station 120 and the synchronization data at the neighboring base transceiver station(s) 130.

In yet another alternative, one or more predetermined mobile station handoff times are monitored such that the synchronization signal generator circuit 245 sends synchronization signals at a time that corresponds to the predetermined mobile station handoff time. In certain wireless communication systems 100, the mobile station 110 will handoff at certain predetermined times or intervals. Therefore, in this embodiment, the synchronization signal generator circuit 245 will send a synchronization signal a certain number of seconds prior to the predetermined mobile station handoff time to maximize the efficiency of the handoff. In other words, the synchronization signal will be sent such that it arrives at approximately, and typically exactly, the same time as the predetermined handoff time.

In a variation on the above alternative, the primary base transceiver station 120 sends a signal indicating that certain packets will not be transmitted until a predetermined packet sending time when the predetermined function of the at least one factor comprises sending the synchronization signal at predetermined times. In this alternative, the neighboring base transceiver station(s) 130 will have a record of which packets the primary base transceiver station 120 sent to the mobile station 110 at which time. Therefore, the neighboring base transceiver station(s) 130 will be able to quickly provide unsent packets to the mobile station 110 upon a handoff.

In several of the above embodiments, it will be understood that the rate at which synchronization signals are sent may vary along with the monitored factors instead of changing only upon a certain factor's reaching a predetermined amount. For example, in the embodiment where a monitor circuit monitors the signal strength between the mobile station 110 and the primary base transceiver station 120, the rate at which the synchronization signals are sent may vary in a reverse proportional manner with the signal strength between the mobile station 110 and primary base transceiver station 120. Such a continuously varying relationship between the synchronization signal rate and monitored factor may be employed for any monitored factor. Similarly, the synchronization signal rate may vary according to a combination of factors as may be determined by one skilled in the art.

By so tailoring the sending of synchronization signals, the wireless communication system effectively reduces the amount of redundant data sent to the mobile station during a handoff. Further, the wireless communication system experiences lessened traffic burdens by limiting unnecessary synchronization signals. Thus, overall efficiency in the wireless communication system is improved.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   monitoring at least one factor relating to a wireless communication system;
   sending a synchronization signal to at least one base transceiver station neighboring a primary base transceiver station at a predetermined rate at least in part according to a predetermined function of said monitoring said at least one factor.

2. The method of claim 1 wherein sending a synchronization signal further comprises sending synchronization signals at the predetermined rate when detecting that the wireless communication system is operating at a peak hour time when the at least one factor is the peak 15 hour time.

3. The method of claim 2 wherein sending synchronization signals at the predetermined rate when detecting that the wireless communication system is operating at the peak hour time further comprises sending synchronization signals at an increased rate relative to the predetermined rate when detecting that the wireless communication system is operating outside of the peak hour time.

4. The method of claim 1 wherein sending a synchronization signal further comprises sending synchronization signals at the predetermined rate when detecting that a traffic load 25 exceeds a predetermined level when the at least one factor is the traffic load.

5. The method of claim 1 wherein sending a synchronization signal further comprises sending synchronization signals at the predetermined rate when detecting that the quality of channel factor of the at least one base transceiver station neighboring the primary base transceiver station exceeds a predetermined level relative to the primary base transceiver station quality of channel factor when the at least one factor is a relationship between a primary base transceiver station quality of channel factor and a quality of channel factor of the at least one base transceiver station neighboring the primary base transceiver station.

6. The method of claim 1 wherein sending a synchronization signal further comprises sending synchronization signals at the predetermined rate when detecting that a quality of service factor exceeds a predetermined level when the at least one factor is the quality of service factor for a given mobile station.

7. The method of claim 1 wherein sending a synchronization signal further comprises sending synchronization signals at the predetermined rate when detecting that a mobility factor exceeds a predetermined level when the at least one factor is the mobility factor for a given mobile station.

8. The method of claim 1 wherein sending a synchronization signal further comprises sending synchronization signals at the predetermined rate when detecting that a data amount sent to a given mobile station from the primary base transceiver station exceeds a predetermined level when the at least one factor is the data amount sent to the given mobile station from the primary base transceiver station.

9. The method of claim 1 wherein sending a synchronization signal further comprises sending synchronization signals at the predetermined rate when detecting that a buffer data size stored in a buffer corresponding to the primary base station exceeds a predetermined level when the at least one factor is the buffer data size stored in the buffer corresponding to the primary base transceiver station.

10. The method of claim 1 wherein sending a synchronization signal further comprises sending synchronization signals at the predetermined rate when detecting that a transmission rate of data from the primary base station to a mobile station exceeds a predetermined level when the at least one factor is the transmission rate.

11. The method of claim 1 wherein sending a synchronization signal further comprises sending synchronization signals at a time that corresponds to a predetermined mobile station handoff time when the at least one factor is the predetermined mobile station handoff time.

12. The method of claim 1 further comprising sending a signal indicating that certain packets will not be transmitted until a predetermined packet sending time when the predetermined function of the at least one factor comprises sending the synchronization signal at predetermined times.

13. The method of claim 1 wherein sending a synchronization signal further comprises any one of at least one step from the group comprising:
   sending a signal corresponding to an indication of data at a front end of a buffer corresponding to the primary base transceiver station;
   sending a signal corresponding to a mapping of data stored in a buffer corresponding to the primary base transceiver station;
   determining at the primary base transceiver station a transmission rate history for a mobile station, predicting in accordance with the transmission rate history a data set that will be at a front end of a buffer corresponding to the primary base transceiver station when the at least one base transceiver station receives the synchronization signal, and
   sending a signal corresponding to the data set;
   determining at the primary base transceiver station a transmission rate history for a mobile station, determining in accordance with the transmission rate history a certain data set that will be at a front end of a buffer corresponding to the primary base transceiver station at a predetermined time, and sending a signal corresponding to the certain data set; and
   determining at the primary base transceiver station a transmission rate history for a mobile station and sending a signal corresponding to the transmission rate history.

14. The method of claim 13 wherein determining at the primary base transceiver station the transmission rate history for the mobile station and sending the signal corresponding to the transmission rate history further comprises determining at the at least one base transceiver station 25 according to the transmission rate history a discardable data and discarding the discardable data.

15. The method of claim 1 further comprising discarding data corresponding to the synchronization signal from a buffer corresponding to the at least one base transceiver station.

16. The method of claim 1 wherein the step of sending the synchronization signal is performed in conjunction with sending an updated data to the at least one base transceiver station.

17. The method of claim 1 wherein the step of sending the synchronization signal is performed in conjunction with sending data other than the synchronization signal to a base station controller from the primary base transceiver station.

18. An apparatus comprising:
- at least one wireless communication system factor monitor circuit for monitoring at least one factor relating to a wireless communication system;
- a processor circuit operably coupled to the wireless communication system factor monitor;
- a synchronization signal generator circuit for sending a synchronization signal to at least one base transceiver station neighboring a primary base transceiver at a predetermined rate at least in part according to a predetermined function of said monitoring at least one factor, the synchronization signal generator circuit responsive to said wireless communication system factor monitor circuit and said processor circuit.

19. The apparatus of claim 18 wherein said at least one wireless communication system factor monitors circuit further comprises any one factor of the group comprising:
- a peak hour time monitor;
- a traffic load monitor;
- a primary base transceiver station quality of channel factor monitor and a neighboring base transceiver station quality of channel factor monitor;
- a quality of service factor monitor;
- a quality of channel factor monitor;
- a mobility factor monitor;
- a sent data monitor; and
- buffer monitor.

20. An apparatus comprising: means for monitoring at least one factor relating to a wireless communication system;
- means for sending a synchronization signal to at least one base transceiver station neighboring a primary base transceiver station at a predetermined rate at least in part according to a predetermined function of said monitoring said at least one factor.

\* \* \* \* \*

UNITED STATES PATENT AND TRADEMARK OFFICE
CERTIFICATE OF CORRECTION

PATENT NO. : 7,450,944 B2  Page 1 of 1
APPLICATION NO. : 11/266469
DATED : November 11, 2008
INVENTOR(S) : Leelahakriengkrai et al.

It is certified that error appears in the above-identified patent and that said Letters Patent is hereby corrected as shown below:

In Column 7, Line 34, after "do" insert -- not --.

In Column 11, Line 38, in Claim 4, after "load" delete "25".

In Column 12, Line 57, in Claim 14, after "station" delete "25".

In Column 13, Line 20, in Claim 19, delete "monitors" and insert -- monitor --, therefor.

In Column 14, Line 11, in Claim 19, insert -- a -- before "buffer".

Signed and Sealed this

First Day of September, 2009

David J. Kappos
*Director of the United States Patent and Trademark Office*